United States Patent [19]
Long et al.

[11] Patent Number: 5,940,508
[45] Date of Patent: Aug. 17, 1999

[54] METHOD AND APPARATUS FOR SEAMLESS CRYPTO REKEY SYSTEM

[75] Inventors: Craig Allen Long, Mesa; William Robert Worger, Gilbert; Bradley Robert Schaefer, Chandler, all of Ariz.

[73] Assignee: Motorola, Inc., Schaumburg, Ill.

[21] Appl. No.: 08/834,963

[22] Filed: Apr. 7, 1997

[51] Int. Cl.[6] .................... H04L 9/08; H04L 9/00
[52] U.S. Cl. ..................... 380/21; 380/9; 380/42; 380/44; 380/46; 380/49
[58] Field of Search .................... 380/9, 21, 42, 380/43, 49, 50, 59, 23, 25, 45, 47, 44, 46, 48

[56] References Cited

U.S. PATENT DOCUMENTS 5,224,166  6/1993  Hartman, Jr. .......................... 380/50
5,381,479  1/1995  Gardeck et al. ........................ 380/21

*Primary Examiner*—Bernarr E. Gregory
*Attorney, Agent, or Firm*—Frank J. Bogacz

[57] ABSTRACT

Equipment (10, 20) for facilitating point-to-point cryptographic data communication systems is disclosed. The seamless rekey cryptosystem permits changing of the crypto key (70, 80) with no down time. The cryptosystem will facilitate seamless key installation to eliminate data loss or reduce storage required while updating the crypto key. The seamless key will allow changing the key more often, which will also provide a more robust, secure cryptosystem.

16 Claims, 2 Drawing Sheets

FIG. 1 - PRIOR ART -
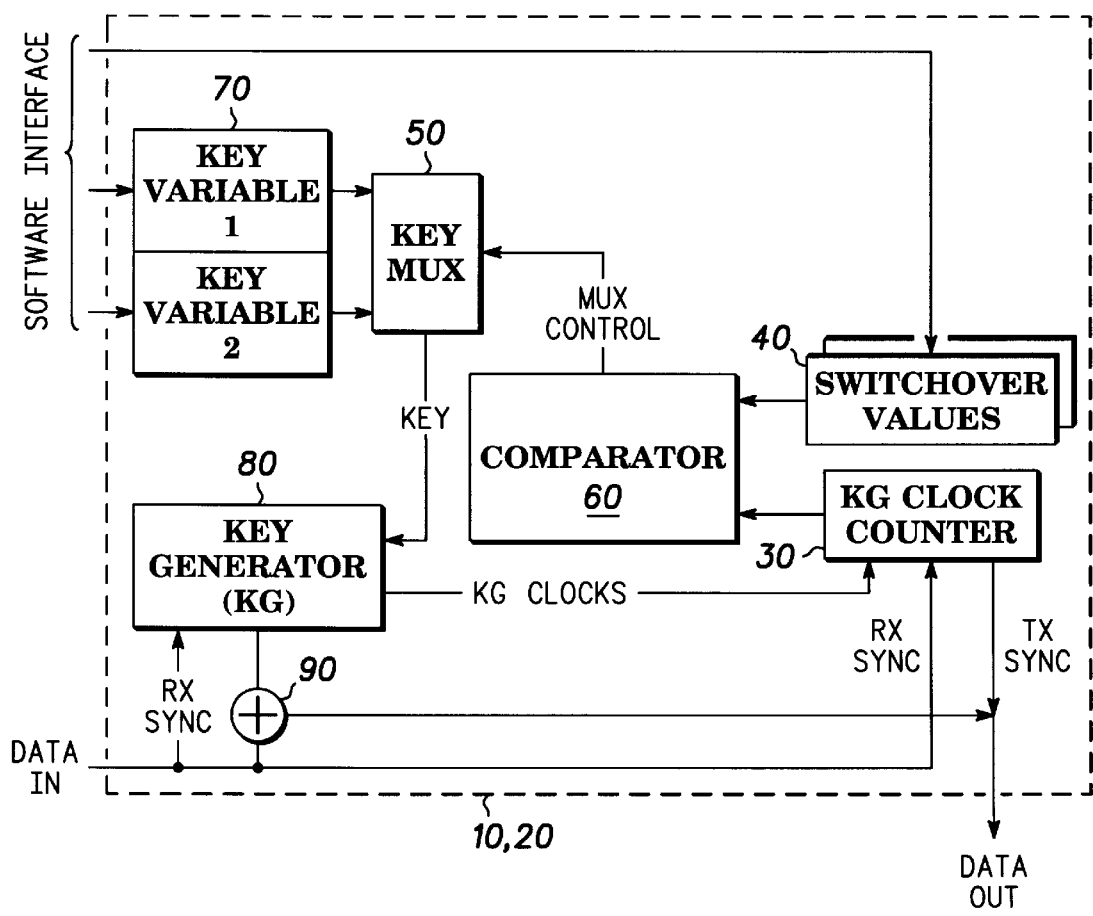
FIG. 2

METHOD AND APPARATUS FOR SEAMLESS CRYPTO REKEY SYSTEM

BACKGROUND OF THE INVENTION

The present invention pertains to point-to-point cryptographic systems and more particularly to seamless rekey cryptographic systems.

Point-to-point cryptographic systems are used to prevent unauthorized access to data on communication links. Seamless rekey cryptographic systems reduce data storage requirements and allow changing the crypto key more often resulting in a more secure and robust cryptosystem. In typical point-to-point cryptographic systems, an encryption or send unit transmits encrypted or coded digital data to a de-cryption or receive unit over a secure data link.

The digital data is encoded using a key known only to the send and receive units to deny data access by any unauthorized receiver. The encryption key has variables that can be changed periodically to aid in preventing the key from being easily dechipered by examining the transmitted encoded data.

Present state of the art cryptographic key generators have a basic limitation. The changing of a variable in the encryption key requires downtime on the encrypted data communications link. The changing of the crypto key is referred to as the "variable update" or the "change variable" process.

The process of changing the key's variable requires the data traffic in the link to be suspended, a new variable placed into the key generator (KG) of the cryptosystem, and the send and transmit equipments must go through a resynchronization on the new variable in the key. The need for resynchronization can cause downtime on the link of 10's of seconds, or more. For very high speed encryptors of over 1 Giga bits per second, the need for resynchronization could result in a loss or blockage of huge amounts of data.

The data could be real-time data, where the loss of the data is not protected through buffering or protocols, and therefore constitutes a significant data loss issue, or requires providing large data storage capability during the rekey operation.

Because of the lost data issue, the operational policies of cryptosystem management balance the need to rekey for security of the link versus the concern over a loss of data. Typically the cryptosystem will minimize downtime as much as possible and only change keys as needed to try to prevent in-depth traffic analysis.

Accordingly, it is an advantage of the present invention to provide an of implementation a seamless rekey system for improved operation and security of cryptographic data communication equipment.

BRIEF DESCRIPTION OF THE DRAWING

FIG. 1 is a block diagram depicting a prior art point-to-point cryptosystem.

FIG. 2 is a block diagram of a basic point-to-point cryptosystem architecture for a seamless rekey cryptosystem in accordance with the present invention.

DESCRIPTION OF THE PREFERRED EMBODIMENT

Figure 3:
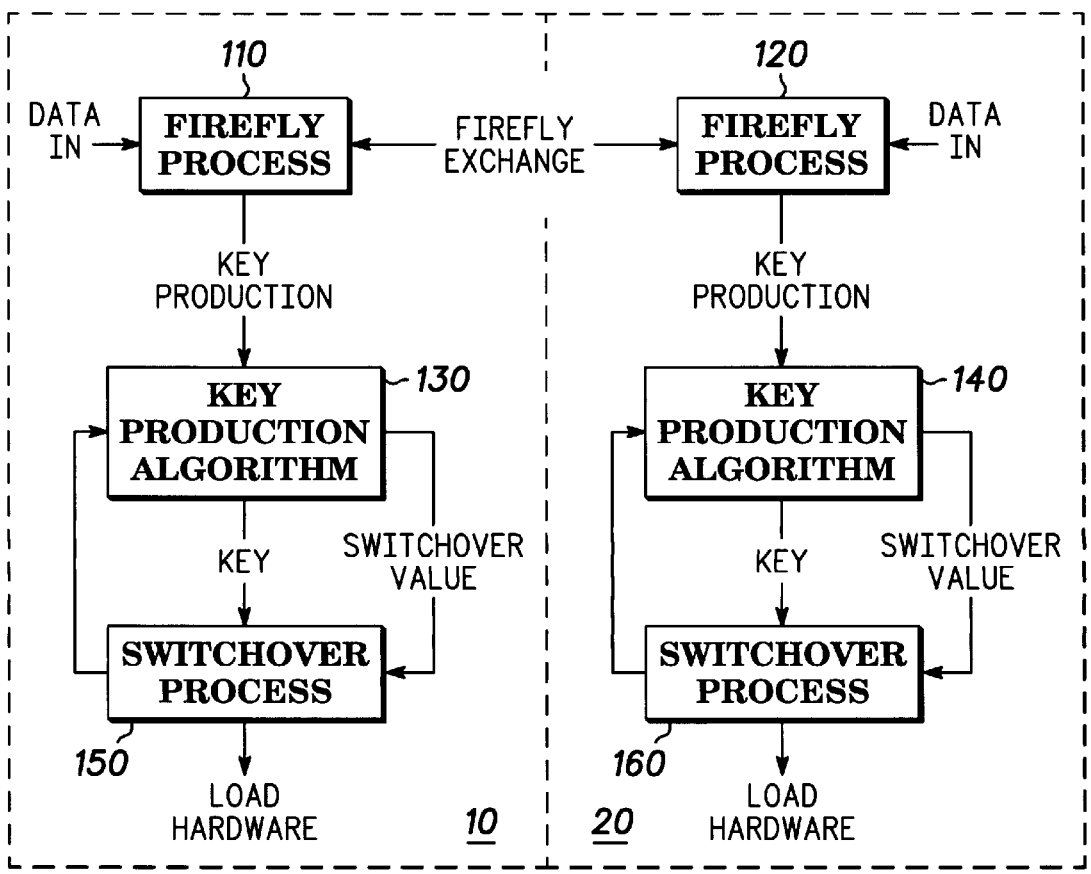
FIG. 3 is an illustration of the architecture for automatic rekey of the cryptosystem in accordance with the present invention.

In accomplishing the object of the present invention to provide a seamless rekey of the cryptosystem, a novel method and apparatus for changing the cryptosystem key will be shown. Referring to FIG. 1, a block diagram is shown of well known point-to-point cryptosystems.

Data to be made secure over a communication link by coding is entered into the encryptor equipment 10 where the digital data is encrypted. The encrypted data is sent over the data link to the decryptor equipment 20. The digital data is then decrypted, and the restored data exits the equipment.

Typically, these systems are full duplex, with the same data path occurring from decryptor equipment 20 to encryptor equipment 10. The equipment 10 and 20 can be similar units. For the sake of simplicity in the description of the present invention, only one direction will be discussed. The approach is replicated in the reverse direction.

FIG. 2 is a block diagram in accordance with the present invention architecture for manual rekeying of crypto equipments 10 and 20. A key generator (KG) is used to change the encryption key to prevent sufficient data being available for the code to be readily broken.

In previous point-to-point cryptosystems, the encryptor equipment 10 provides the indication that a change variable should occur. During the changing of the variable, traffic between encryptor equipment 10 and decryptor equipment 20 is halted. The new key variables are loaded into the KGs of the cryptosystem equipments 10 and 20, and the crypto key resynchronization process occurs next. The data traffic is then started back flowing through the system.

The components typically used in crypto equipment 10 and 20 as shown in FIG. 2 are well known to those versed in the state of the art. The components include a data in lead and a data out lead, a Modulo 2 adder/exclusive OR function 90, and a key generator (KG) 80.

A software interface provides control of the crypto equipment. Synchronization and resynchronization is accomplished through a receive/transmit (RX) line.

The additional components used to implement the present invention are a bank of key variables 70, a key multiplexor (MUX) 50, a KG clock (CLK) counter 30, a switchover comparison register(s) 40, and a comparator 60 to control the MUX 50.

The basic principle of the seamless crypto rekey invention is presented next. The cryptosystem is first loaded with two KG variables 70, key variable 1 and key variable 2. The key variables are loaded via a loading mechanism providing the software interface to control switch over. Providing variables 70 could possibly be done with a bank of many variables or a single variable for the key. A switchover value is then loaded into the switchover comparison register 60. The KG CLK counter 30 then counts KG clock states.

When the KG Clk counter 30 reaches a specified switchover value (checked by the comparator 60), the key MUX 50 switches from key variable 1 to key variable 2 (70). The switching of variables is done synchronously relative to the KG timing so that the KG state is known.

Both encryption equipments, 10 and 20, perform the switchover at exactly the same KG state because the switchover is based on KG clocks, and not based on time or other control options. With the switchover from one variable to another occurring seamlessly, the KG states are preserved in the two encryption equipments 10 and 20, and the rekey occurs with no degradation of crypto data traffic.

The seamless rekey approach makes the rekey time invariant and path delay invariant, so that regardless of the amount of data traffic "in flight" between the two encryption equipments 10 and 20, the switchover will still occur at the desired bit boundary with no traffic downtime or loss of data. A loss of data synchronization or any need to provide re-synchronization between the two encryption equipments 10 and 20 is readily accomplished in accordance with the present invention.

As part of the synchronization process to flush the KGs to achieve a known KG state, a known value is provided to the receiving or decryption equipment 20 to initialize the KG Clk counter 30. Therefore, part of the KG flush pattern provided by encryptor equipment 10 includes the KG Clk counter 30 state.

This provides a method of informing the receiving or decryptor equipment 20 when to start incrementing the KG Clk counter 30, such as a sync/start pattern or flag. Both of the encryption equipments 10 and 20 will then resync the KG Clk counter 30. Both KGs will begin to count KG clocks at the correct data bit boundary.

In addition to the KG Clk counter 30 data, additional information may be sent in the initialization/flush stream. The initialization may include the expected switchover value, and perhaps key identification (ID) to inform the receiving equipment as to which key variable is to be used.

These initialization options are dependent on how the key management services are to be used. The receiving equipment may already know the switchover values, and procedures could be developed to ensure that both equipments already know the key ID and key to be used.

The need for additional information to be sent to the receiver is therefore, dependent on the implementation of architecture and key management for manual or automatic rekey approaches used in accordance with the present invention.

While we have shown a manual cryptosystem, the same techniques can be applied to automatic rekey systems such as Firefly as shown in FIG. 3. Encryptor equipment 10 and decryptor equipment 20 are automated for the rekeying. FIG. 3 is a block diagram in accordance with an automated rekey cryptosystem, Firefly 110 and 120, as examples. Referring to FIG. 3, the encryptor equipment for the automatic rekey system includes the key production algorithms 130 and 140, plus switchover processors 150 and 160.

The present manual or automated invention eliminates the down time associated with changing a key variable through use of seamless rekey of the cryptosystem. By not having any down time during a rekey, and by providing a system that stays synchronized during the rekey, new operational methods of key management are possible to increase security of the encrypted data link. Loss of data or buffers and large data storage capability needs are also eliminated.

The cryptosystem of the present invention may provide seamless updating of a crypto key or seamlessly changing keys much more frequently than is presently done, since there is no penalty associated with the crypto rekey.

In fact, crypto key variables may be changed often enough that the cryptosystem is much more robust because less traffic depth can be obtained on a variable of a particular key. Therefore, cryptosystems may be made much more secure.

Although the current preferred embodiment of the invention has been illustrated, and that form described in detail, it will be readily apparent to those skilled in the art that various modifications may be made therein without departing from the spirit of the present invention or from the scope of the appended claims.

What is claimed is:

1. A method for a seamless cryptographic key system comprising the steps of:

encrypting digital data for transmission over a secure data link;

decrypting data from the secure data link;

seamlessly updating a cryptographic key for encrypting and decrypting said digital data; and the step of seamlessly updating includes the step of loading said key variables into said cryptographic key generator by an interface means to control switch-over of said cryptographic key generator new key variables.

2. A method for a seamless cryptographic rekey system as claimed in claim 1, wherein said seamlessly updating the cryptographic key step further includes a step of using a cryptographic key generator.

3. A method for a seamless cryptographic rekey system as claimed in claim 2, wherein said step of using said cryptographic key generator further includes a step of providing key variables to said cryptographic key generator.

4. A method for a seamless cryptographic rekey system as claimed in claim 3, wherein the step of seamlessly updating said cryptographic key further includes the step of loading a switch-over value into a comparator to control said switch-over.

5. A method for a seamless cryptographic rekey system as claimed in claim 4, wherein the step of seamlessly updating said cryptographic key further includes the step of counting by a counter cryptographic key generator clock states.

6. A method for a seamless cryptographic rekey system as claimed in claim 5, wherein the step of seamlessly updating said cryptographic key includes the step of, switching a multiplexer for both an encrypting subsystem and a decrypting subsystem from the key variable to a new key variable when the counter reaches the specified state.

7. A method for a seamless cryptographic rekey system as claimed in claim 1, wherein the step of seamlessly updating said cryptographic key further includes the step of seamless updating the cryptographic key automatically by the encrypting and decrypting equipment.

8. An apparatus for a seamless cryptographic system comprising:

encryptor equipment for encrypting digital data for transmission over a data link;

decryptor equipment for decrypting digital data received from the data link;

a seamless cryptographic key generator for updating key variables for encrypting and decrypting said digital data; and a key generator clock counter for counting states, said key generator clock counter coupled to said seamless cryptographic key generator.

9. An apparatus for a seamless cryptographic system as claimed in 8, wherein said seamless cryptographic key generator provides a cryptographic key for encrypting and decrypting said digital data.

10. An apparatus for a seamless cryptographic system as claimed in 8, wherein said cryptographic key includes a plurality of cryptographic key variables for encrypting and decrypting said digital data.

11. An apparatus for a seamless cryptographic system as claimed in 8, wherein the seamless cryptographic key generator includes updating interface means for loading said cryptographic key into said key generator clock counter.

12. An apparatus for a seamless cryptographic system as claimed in 11, wherein there is further included a switch-over register for storing switch-over values.

13. An apparatus for a seamless cryptographic system as claimed in 12, wherein there is further included a comparator to determine when the key generator clock counter reaches the specified switch over value, said comparator coupled to said switch-over register and coupled to said key generator clock counter.

14. An apparatus for a seamless cryptographic system as claimed in 13, wherein there is further included a multiplexer, said multiplexer for seamlessly switching the encryptor equipment and the decryptor equipment from a key variable to a new key variable, said multiplexer coupled to said comparator, said key generator and said plurality of cryptographic key variables.

15. An apparatus for a seamless cryptographic system as claimed in 14, wherein there is further included a Modulo 2 adder/exclusive-OR means for use in synchronization and resynchronization, said Modulo 2 adder/exclusive-OR function coupled to said key generator.

16. An apparatus for a seamless cryptographic system as claimed in 15, wherein there is further included a receive sync line for synchronization and resynchronization, said receive sync line coupled to said key generator and said key generator clock counter.

\* \* \* \* \*